United States Patent
Brown et al.

(10) Patent No.: US 8,892,807 B2
(45) Date of Patent: Nov. 18, 2014

(54) EMULATING A SKIP READ COMMAND (75) Inventors: William A. Brown, Pine Island, MN (US); Thomas R. Crowley, Rochester, MN (US); Steven M. Howe, Rochester, MN (US); Kristopher C. Whitney, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 611 days.

(21) Appl. No.: 13/088,665

(22) Filed: Apr. 18, 2011

(65) Prior Publication Data

US 2012/0265948 A1 Oct. 18, 2012

(51) Int. Cl.
*G06F 12/00* (2006.01)
*G06F 13/16* (2006.01)
*G06F 9/00* (2006.01)

(52) U.S. Cl.
CPC . *G06F 13/16* (2013.01); *G06F 9/00* (2013.01)
USPC ........................................................ 711/103

(58) Field of Classification Search
USPC ................................. 711/103, 154
See application file for complete search history.

(56) References Cited

U.S. PATENT DOCUMENTS

| | | | |
|---|---|---|---|
| 5,623,701 A | 4/1997 | Bakke et al. | |
| 5,684,986 A | 11/1997 | Moertl et al. | |
| 6,470,461 B1 * | 10/2002 | Pinvidic et al. | 714/6.13 |
| 7,711,871 B1 | 5/2010 | Haechten et al. | |
| 7,899,945 B2 * | 3/2011 | Haechten et al. | 710/5 |
| 2004/0199515 A1 * | 10/2004 | Penny et al. | 707/10 |
| 2010/0011145 A1 * | 1/2010 | Carver et al. | 710/310 |
| 2010/0241769 A1 | 9/2010 | Haechten et al. | |
| 2011/0022779 A1 * | 1/2011 | Lund et al. | 711/103 |
| 2011/0131374 A1 * | 6/2011 | Noeldner et al. | 711/114 |

* cited by examiner

*Primary Examiner* — April Y Blair
*Assistant Examiner* — Trang Ta
(74) *Attorney, Agent, or Firm* — Owen J. Gamon; Roy W. Truelson (57) ABSTRACT

In an embodiment, a skip read command is received that requests transfer of a requested block from a storage device and that requests non-transfer of a skipped block from the storage device. The skip read command specifies a skip mask that comprises an identification of a location of the requested block relative to a location of the skipped block at the storage device. In response to the skip read command, the requested block and the skipped block are transferred from the storage device by creating a read command that requests transfer of the requested block and the skipped block and sending the read command to the storage device. In various embodiments, the skipped block is transferred to a temporary buffer and not transferred to a destination buffer, or the skipped block is transferred to the destination buffer, but overwritten by a transfer of the requested block to the destination buffer.

18 Claims, 7 Drawing Sheets

| | | SKIP READ COMMAND | |
|---|---|---|---|
| 206 | 208 | 210 | 212 |
| LOGICAL BLOCK ADDRESS | TRANSFER LENGTH | SKIP MASK | DESTINATION ADDRESS(ES) |
| 64 | 3 | 10101 | 100, 101, 102 |

| | | READ COMMAND |
|---|---|---|
| 306 | 308 | 310 |
| LOGICAL BLOCK ADDRESS | TRANSFER LENGTH | DESTINATION ADDRESS(ES) |
| 64 | 5 | 90, 91, 92, 93, 94 |

| | | READ COMMAND |
|---|---|---|
| 406 | 408 | 410 |
| LOGICAL BLOCK ADDRESS | TRANSFER LENGTH | DESTINATION ADDRESS(ES) |
| 64 | 5 | 100, 90, 101, 91, 102 |

| | | READ COMMAND |
|---|---|---|
| 506 | 508 | 510 |
| LOGICAL BLOCK ADDRESS | TRANSFER LENGTH | DESTINATION ADDRESS(ES) |
| 64 | 5 | 100, 90, 101, 90, 102 |

| | | READ COMMAND |
|---|---|---|
| 606 | 608 | 610 |
| LOGICAL BLOCK ADDRESS | TRANSFER LENGTH | DESTINATION ADDRESS(ES) |
| 64 | 5 | 100, 102, 101, 102, 102 |

EMULATING A SKIP READ COMMAND

FIELD

An embodiment of the invention generally relates to computer systems and more particularly to emulating a skip read command.

BACKGROUND

Computer systems typically comprise a combination of computer programs and hardware, such as semiconductors, transistors, chips, circuit boards, storage devices, and processors. The computer programs are stored in the storage devices and are executed by the processors. The storage devices also store data.

Some storage devices support a type of command known as a skip read. The skip read command specifies a logical block address (LBA), a transfer length, and a skip mask. The skip mask specifies which data in a range of logical blocks of data is requested to be transferred (read or copied) from the storage device to the host computer system that issues the skip read command. A bit set to one in the skip mask typically means that the data corresponding to the bit is transferred from the storage device to the issuing host computer system. A bit set to zero in the skip mask typically means that the corresponding block is skipped and is not transferred from the storage device to the host computer system. A block is the smallest unit of data that the storage device transfers. The transfer length specifies the number of blocks to be transferred from the storage device to the host system and matches the number of bits set to one in the skip mask.

For example, if the transfer length is three, then exactly three bits are set to one in the skip mask. The logical block address specified in the command is the address of a block on the storage device, which corresponds to, or is identified by, the first bit (typically the left-most or most significant bit) in the skip mask. The block at the logical block address specified by the command may or may not be transferred from the storage device, depending on whether or not the first bit in the skip mask is set. For example, for a skip command that specifies a logical block address of 64, a transfer length of 3, and a binary skip mask of 10011b, a data block at logical block address 64 is transferred, data blocks at logical block addresses 65 and 66 are skipped, and data blocks from logical block addresses 67 and 68 are transferred.

SUMMARY

A method, computer-readable storage medium, and computer system are provided. In an embodiment, a skip read command is received that requests transfer of a requested block from a storage device and that requests non-transfer of a skipped block from the storage device. In an embodiment, the skip read command specifies a skip mask that comprises an identification of a location of the requested block relative to a location of the skipped block at the storage device. In response to the skip read command, the requested block and the skipped block are transferred from the storage device by creating a read command that requests transfer of the requested block and the skipped block and sending the read command to the storage device. In various embodiments, the skipped block is transferred to a temporary buffer and not transferred to a destination buffer, or the skipped block is transferred to the destination buffer, but overwritten by a transfer of the requested block to the destination buffer.

It is to be noted, however, that the appended drawings illustrate only example embodiments of the invention, and are therefore not considered a limitation of the scope of other embodiments of the invention.

DETAILED DESCRIPTION

Figure 1:
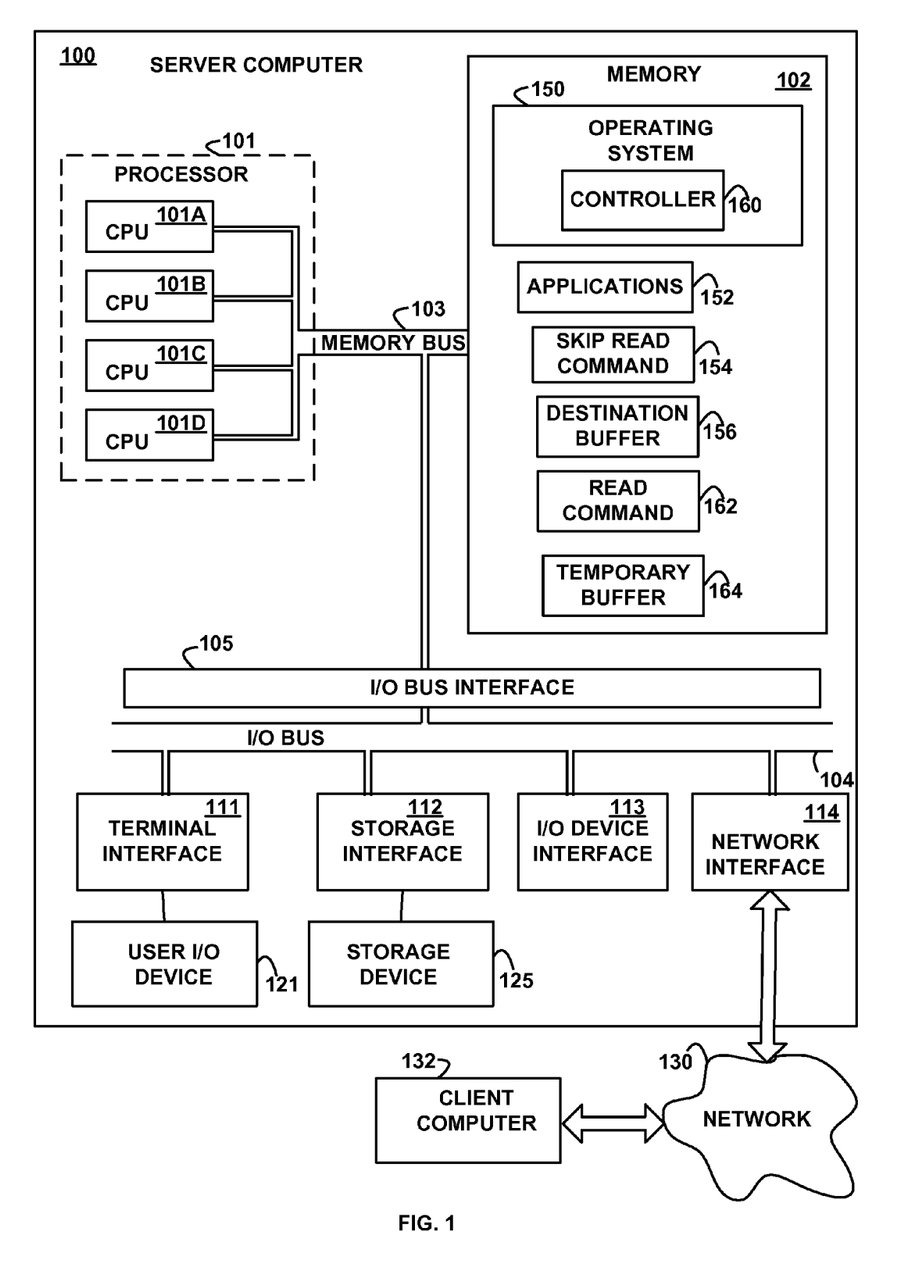
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The term "server" is used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the computer system 100 comprise one or more processors 101, a memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the memory 102 and may comprise one or more levels of on-board cache.

In an embodiment, the memory 102 may comprise a random-access semiconductor memory, storage device, or storage medium for storing or encoding data and programs. In another embodiment, the memory 102 represents the entire virtual memory of the computer system 100, and may also include the virtual memory of other computer systems coupled to the computer system 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 is encoded with or stores an operating system 150, applications 152, a skip read command 154, a destination buffer 156, a read command 162, and a temporary buffer 164. Although the operating system 150, the applications 152, the skip read command 154, the destination buffer 156, the read command 162, and the temporary buffer 164 are illustrated as being contained within the memory 102, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, the operating system 150, the applications 152, the skip read command 154, the destination buffer 156, the read command 162, and the temporary buffer 164 are not necessarily all completely contained in the same storage device at the same time. Further, although the operating system 150, the applications 152, the skip read command 154, the destination buffer 156, the read command 162, and the temporary buffer 164 are illustrated as being separate entities, in other embodiments some of them, portions of some of them, or all of them may be packaged together.

In an embodiment, the operating system 150 and the applications 152 comprise instructions or statements that execute on the processor 101 or instructions or statements that are interpreted by instructions or statements that execute on the processor 101, to carry out the functions as further described below with reference to FIGS. 2, 3, 4, 5, 6, 7, 8, 9, 10, 11, 12, and 13. In another embodiment, the operating system 150 and/or the applications 152 are implemented in hardware via semiconductor devices, chips, logical gates, circuits, circuit cards, and/or other physical hardware devices in lieu of, or in addition to, a processor-based system. In an embodiment, the operating system 150 and/or the applications 152 comprise data in addition to instructions or statements. The operating system 150 comprises a controller 160. In another embodiment, the controller 160 is separate from the operating system 150.

The controller 160 receives the skip read command 154 from the operating system 150 or the applications 152. The skip read command 154 identifies a storage device 125, requested blocks of data, skipped blocks, and the destination buffer 156, into which the requested data blocks are to be transferred from the storage device 125. The controller 160 emulates the skip read command 154 by creating and sending the read command 162 to the storage device 125. In an embodiment the controller 160 allocates the temporary buffer 164, into which the storage device 125 or the storage interface 112 transfers the skipped blocks and the requested blocks. In an embodiment, the issuer of the skip read command 154 reads the requested blocks (after transfer) from the destination buffer 156 and does not access the temporary buffer 164 or read the requested blocks or the skipped blocks from the temporary buffer 164. In an embodiment where the skipped blocks are transferred to the destination buffer 156, the skipped blocks are overwritten by requested blocks prior to the time that the locations to which the skipped blocks are transferred are read by the issuer of the skip read command 154. In an embodiment, the temporary buffer 164 is not used or, if used, only receives the transfer of the skipped blocks.

The memory bus 103 provides a data communication path for transferring data among the processor 101, the memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the memory 102, or any portion thereof, may be stored to and retrieved from the storage device 125, as needed. The I/O device interface 113 provides an interface to any of various other input/output devices or devices of other types, such as printers or fax machines. The network adapter 114 provides one or more communications paths from the computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer system 100 and the computer system 132. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The client computer 132 may comprise some or all of the hardware and computer program elements of the computer 100. The client computer 132 may also comprise additional elements not illustrated for the computer 100.

FIG. 1 is intended to depict the representative major components of the computer system 100, the network 130, and the client computer 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, radio frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
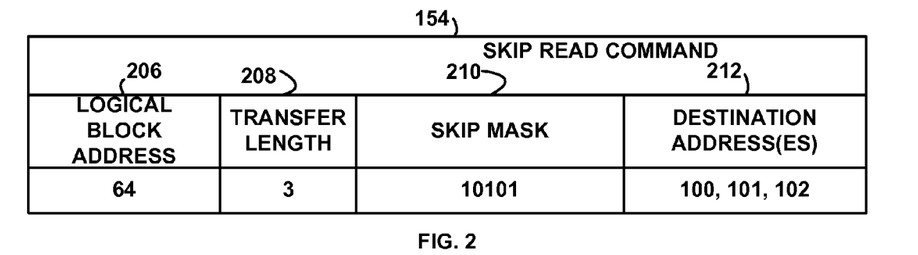
FIG. 2 depicts a block diagram of an example data structure for a skip read command, according to an embodiment of the invention.

FIG. 2 depicts a block diagram of an example data structure for a skip read command 154, according to an embodiment of the invention. The skip read command 154 comprises a logical block address 206, a transfer length 208, a skip mask 210, and destination address(es) 212. The skip mask 210 specifies which data in a range of logical blocks of data, starting at the logical block address 206, is requested to be transferred (the requested blocks) from a storage device 125 to the destination address(es) 212 in the destination buffer 156 at the computer system 100 that issues the skip read command and which data is requested to be skipped (the skipped blocks) and not transferred from the storage device 125 to the destination buffer 156. The skip mask 210 specifies the relative location of each requested block and each skipped block relative to every other requested block and skipped block. In various embodiments the requested blocks and skipped blocks are interleaved at the storage device 125, one or more contiguous requested blocks may be separated from other requested blocks by one or more skipped blocks, and/or one or more contiguous skipped blocks may be separated from other skipped blocks by one or more requested blocks.

A bit set to one in the skip mask 210 means that the data block corresponding to, or identified by, the bit is a requested block and is requested to be transferred from the storage device 125 to the destination address 212 corresponding to the position of the bit in the skip mask 210. A bit set to zero in the skip mask 210 means that the corresponding or identified block is a skipped block and is requested to be skipped and is not to be transferred from the storage device 125 to any of the destination address(es) 212 in the destination buffer 156. In various embodiments, any memory amount may be used for the skip mask 210, such as bits, bytes, or any other amount. In various embodiments, one and zero may be reversed in the skip mask 210 or other values such as true and false may be used. A block is the amount or smallest unit of data that the storage device 125 may transfer to the destination address 212, but in other embodiments pages, frames, or any other units may be used. The transfer length 208 specifies the amount of data (the number of blocks) that is requested to be transferred from the storage device 125 to the destination address 212 and matches the number of bits set to one in the skip mask 210.

The destination address(es) 212 specifies either one address in the memory 102 of the requester or multiple addresses, one for each requested block. If multiple addresses are specified in the destination address 212, they may all be identical, some of them may be identical, or all my be different. The multiple addresses may be contiguous, non-contiguous, or partially contiguous.

In the illustrated example, the transfer length 208 is three, meaning that exactly three bits are set to one in the skip mask 210. The logical block address 206 specifies the address of a block on the storage device, which corresponds to, or is identified by, the first bit (e.g., the left-most bit) in the skip mask 210. The block at the logical block address 206 may or may not be transferred from the storage device, depending on whether or not the first bit in the skip mask 210 is set. In the illustrated example, the logical block address 206 is 64, the transfer length 208 is 3, and the skip mask 210 is 10101, so the illustrated skip read command 154 requests that the data blocks at logical block addresses 64, 66, and 68 be transferred to the requested destination addresses "100," "101," and "102," respectively, and the data blocks at logical block addresses 65 and 67 be skipped.

Figure 3:
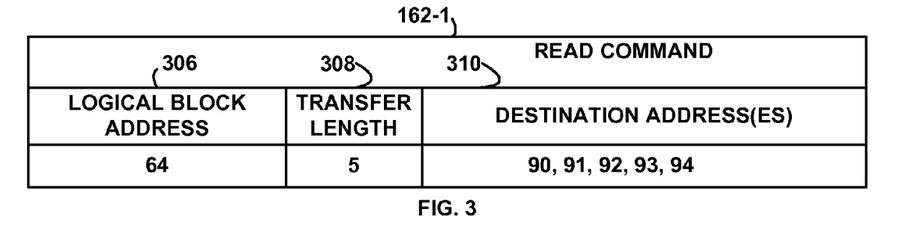
FIG. 3 depicts a block diagram of an example data structure for a read command that emulates a skip read command, according to an embodiment of the invention.

FIG. 3 depicts a block diagram of an example data structure for a read command 162-1 that emulates a skip read command, according to an embodiment of the invention. The read command 162-1 is an example of, and is generically referred to by, the read command 162 (FIG. 1). The read command 162-1 emulates the operation of the skip read command 154. The operation of the read command 162-1 is explained by FIG. 7, as further described below.

Referring again to FIG. 3, the example read command 162-1 comprises a logical block address 306, a transfer length 308, and destination address(es) 310. The logical block address 306 specifies the starting address of a range of addresses at the storage device 125 to which the read command 162-1 is sent and from which the read command 162-1 requests data blocks, having a transfer length 308, to be transferred to the destination address(es) 310 in the memory 102. The logical block address 306 specifies the same address as the logical block address 206 in the skip read command 154. In various embodiments, the destination address(es) 310 may specify locations in the destination buffer 156, the temporary buffer 164, or any combination thereof. In an embodiment, the destination address(es) 310 specifies the same number of addresses as the transfer length 308, one for each data block requested to be transferred from the storage device 125. In another embodiment, the destination address 310 specifies one address, which is the destination address for the first block of data that the read command 162-1 requests to be transferred, with subsequent data blocks requested to be transferred to subsequent addresses in consecutive order following the destination address 310.

In an embodiment, the controller 160 sends the read command 162-1 to an I/O adapter, such as the storage interface 112, which sends a read command 162-1 to the connected storage device 125. In an embodiment, the storage interface 112 sends all of the destination addresses 310 to the storage device 125, which transfers blocks to the destination addresses 310. In another embodiment, the storage interface 112 only sends one address (which specifies a location in memory local to the storage interface 112) to the storage device 125, and the storage device 125 transfers the data blocks to the memory of the storage interface 112, which then transfers the blocks to the multiple destination addresses 310.

Figure 4:
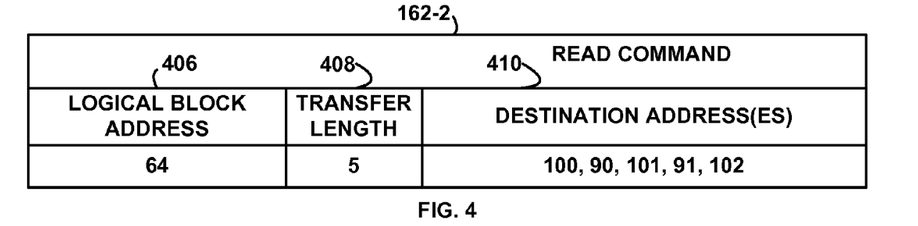
FIG. 4 depicts a block diagram of an example data structure for a read command that emulates a skip read command, according to an embodiment of the invention.

FIG. 4 depicts a block diagram of an example data structure for a read command 162-2 that emulates a skip read command, according to an embodiment of the invention. The read command 162-2 is an example of, and is generically referred to by, the read command 162 (FIG. 1). The read command 162-2 emulates the operation of the skip read command 154. The operation of the read command 162-2 is explained by FIG. 8, as further described below. Referring again to FIG. 4, the example read command 162-2 comprises a logical block address 406, a transfer length 408, and destination address (es) 410, with descriptions analogous to the logical block address 306, the length 308, and the destination address(es) 310, as previously described above.

Figure 5:
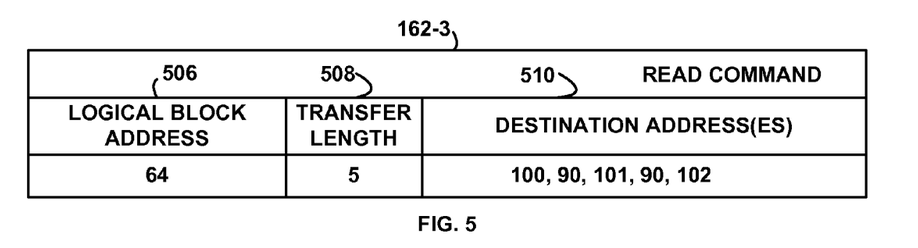
FIG. 5 depicts a block diagram of an example data structure for a read command that emulates a skip read command, according to an embodiment of the invention.

FIG. 5 depicts a block diagram of an example data structure for a read command 162-3 that emulates a skip read command, according to an embodiment of the invention. The read command 162-3 is an example of, and is generically referred to by, the read command 162 (FIG. 1). The read command 162-3 emulates the operation of the skip read command 154. The operation of the read command 162-3 is explained by FIG. 9, as further described below. Referring again to FIG. 5, the example read command 162-3 comprises a logical block address 506, a transfer length 508, and destination address (es) 510, with descriptions analogous to the logical block address 306, the transfer length 308, and the destination address(es) 310, as previously described above.

Figure 6:
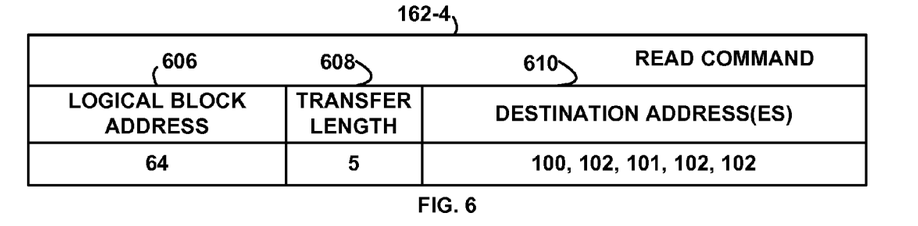
FIG. 6 depicts a block diagram of an example data structure for a read command that emulates a skip read command, according to an embodiment of the invention.

FIG. 6 depicts a block diagram of an example data structure for a read command 162-4 that emulates a skip read command, according to an embodiment of the invention. The read command 162-4 is an example of, and is generically referred to by, the read command 162 (FIG. 1). The read command 162-4 emulates the operation of the skip read command 154. The operation of the read command 162-4 is explained by FIG. 10, as further described below. Referring again to FIG. 6, the example read command 162-4 comprises a logical block address 606, a transfer length 608, and destination address (es) 610, with descriptions analogous to the logical block address 306, the transfer length 308, and the destination address(es) 310, as previously described above.

Figure 7:
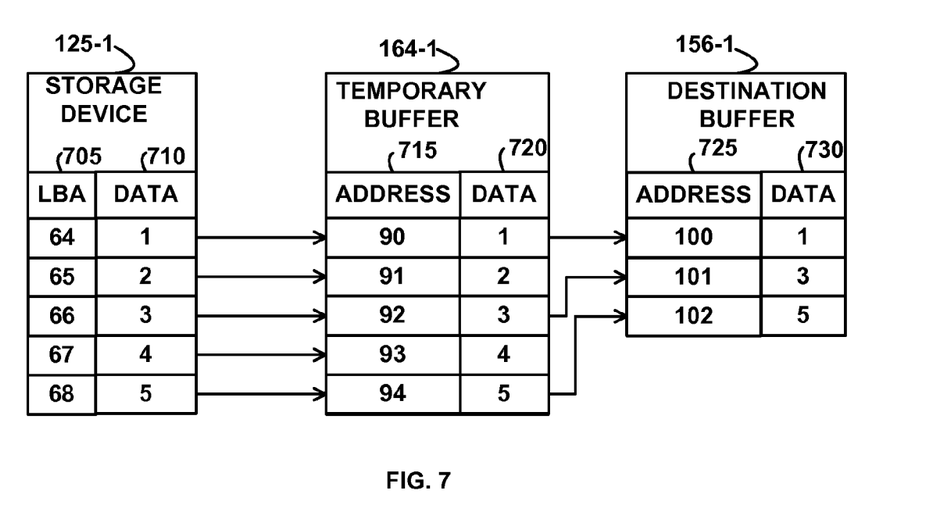
FIG. 7 depicts a block diagram of an example data transfer between a storage device, a temporary buffer, and a destination buffer, according to an embodiment of the invention.

FIG. 7 depicts a block diagram of an example data transfer between a storage device 125-1, a temporary buffer 164-1, and a destination buffer 156-1, according to an embodiment of the invention. The storage device 125-1 is an example of, and is generically referred to by, the storage device 125 (FIG. 1). The temporary buffer 164-1 is an example of, and is generically referred to by, the temporary buffer 164 (FIG. 1). The destination buffer 156-1 is an example of, and is generically referred to by, the destination buffer 156 (FIG. 1). FIG. 7 illustrates the processing of the read command 162-1 (FIG. 3) in emulating the skip read command 154 (FIG. 2). The storage device 125-1 comprises logical block addresses 705 and respective data blocks 710 stored at the locations identified by the respective logical block addresses 705. The temporary buffer 164-1 comprises addresses 715 and respective data blocks 720 stored at the locations identified by the respective addresses 715. The destination buffer 156-1 comprises addresses 725 and respective data blocks 730 stored at the locations identified by the respective addresses 725.

In response to receiving the skip read command 154, the controller 160 allocates the temporary buffer 164-1 large enough to hold both the requested blocks and the skipped blocks specified by the skip mask 210. In response to receiving the skip read command 154. The controller 160 creates the read command 162-1, which requests transfer of both the requested blocks and the skipped blocks from the storage device 125-1 to the temporary buffer 164-1 and sends the read command to the storage device 125-1 via the I/O adapter. The storage device 125-1, via the I/O adapter transfers the requested blocks and the skipped blocks to the temporary buffer 164-1, e.g., by transferring the requested block at the location identified by the logical block address 705 of "64" in the storage device 125-1 to the location identified by the address 715 of "90" in the temporary buffer 164-1, transferring the skipped block at the location identified by the logical block address 705 of "65" in the storage device 125-1 to the location identified by the address 715 of "91" in the temporary buffer 164-1, transferring the requested block at the location identified by the logical block address 705 of "66" in the storage device 125-1 to the location identified by the address 715 of "92" in the temporary buffer 164-1, transferring the skipped block at the location identified by the logical block address 705 of "67" in the storage device 125-1 to the location identified by the address 715 of "93" in the temporary buffer 164-1, and transferring the requested block at the location identified by the logical block address 705 of "68" in the storage device 125-1 to the location indented by the address 715 of "94" in the temporary buffer 164-1.

In response to the transfer of the requested blocks and the skipped blocks to the temporary buffer 164-1, the controller 160 transfers the requested blocks at the locations identified by addresses 715 of "90," "92," and "94" from the temporary buffer 164-1 to the locations identified by the destination buffer addresses 725 of "100," "101," and "102," respectively. The controller 160 does not transfer the skipped blocks at the locations identified by the addresses "91" and "93" from the temporary buffer 164-1 to the destination buffer 156-1; instead, the controller 160 discards the skipped blocks or deallocates the temporary buffer 164-1 without transferring the skipped blocks. Thus, the issuer of the skip read command does not receive the skipped blocks, even though the skipped blocks were transferred from the storage device 125-1.

Figure 8:
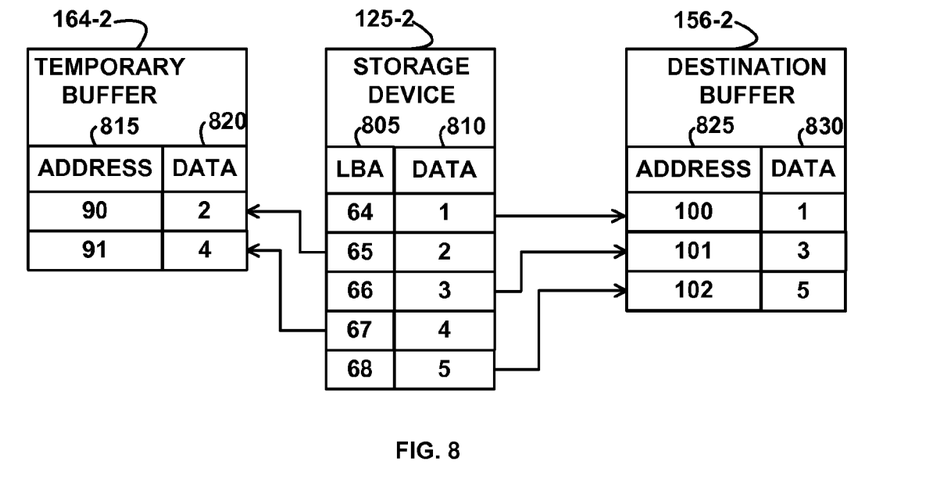
FIG. 8 depicts a block diagram of an example data transfer between a storage device, a temporary buffer, and a destination buffer, according to an embodiment of the invention.

FIG. 8 depicts a block diagram of an example data transfer between a storage device 125-2, a temporary buffer 164-2, and a destination buffer 156-2, according to an embodiment of the invention. The storage device 125-2 is an example of, and is generically referred to by, the storage device 125 (FIG. 1). The temporary buffer 164-2 is an example of, and is generically referred to by, the temporary buffer 164 (FIG. 1). The destination buffer 156-2 is an example of, and is generically referred to by, the destination buffer 156 (FIG. 1). FIG. 8 illustrates the processing of the read command 162-2 (FIG. 4) in emulating the skip read command 154 (FIG. 2). The storage device 125-2 comprises logical block addresses 805 and respective data blocks 810 stored at the locations identified by the respective logical block addresses 805. The temporary buffer 164-2 comprises addresses 815 and respective data blocks 820 stored at the locations identified by the respective addresses 815. The destination buffer 156-2 comprises addresses 825 and respective data blocks 830 stored at the locations identified by the respective addresses 825.

In response to receiving the skip read command 154, the controller 160 allocates the temporary buffer 164-2 large enough to hold the skipped blocks specified by the skip mask 210, but not the requested blocks. The controller 160 creates the read command 162-2, which requests transfer of the requested blocks from the storage device 125-2 to the destination buffer 156-2 and requests transfer of the skipped blocks from the storage device 125-2 to the temporary buffer 164-2 and sends the read command 162-2 to the storage device 125-2 via the I/O adapter. The storage device 125-2, via the I/O adapter, transfers the requested blocks to the destination buffer 156-2 and transfers the skipped blocks to the temporary buffer 164-2, by transferring the requested block at the logical block address 805 of "64" in the storage device 125-2 to the address 825 of "100" in the destination buffer 156-2, transferring the skipped block at the logical block address 805 of "65" in the storage device 125-2 to the address 815 of "90" in the temporary buffer 164-2, transferring the requested block at the logical block address 805 of "66" in the storage device 125-2 to the address 825 of "101" in the destination buffer 156-2, transferring the skipped block at the logical block address 805 of "67" in the storage device 125-2 to the address 815 of "91" in the temporary buffer 164-2, and transferring the requested block at the logical block address 805 of "68" in the storage device 125-2 to the address 825 of "102" in the destination buffer 156-2.

In response to the transfer of the requested blocks to the destination buffer 156-2 and the transfer of the skipped blocks to the temporary buffer 164-2, the controller 160 discards the skipped blocks or deallocates the temporary buffer 164-2 without transferring the skipped blocks from the temporary buffer 164-2 to the destination buffer 156-2, so that the issuer of the skip read command 154 does not receive or read the skipped blocks.

Figure 9:
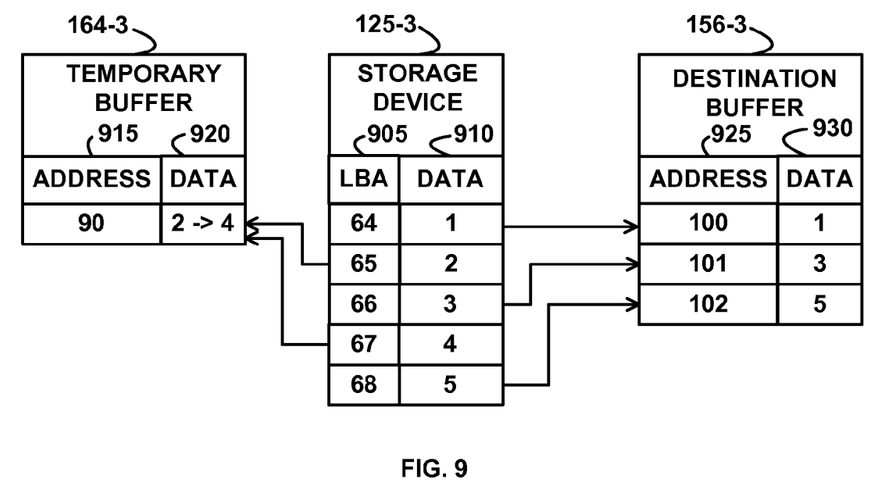
FIG. 9 depicts a block diagram of an example data transfer between a storage device, a temporary buffer, and a destination buffer, according to an embodiment of the invention.

FIG. 9 depicts a block diagram of an example data transfer between a storage device 125-3, a temporary buffer 164-3, and a destination buffer 156-3, according to an embodiment of the invention. The storage device 125-3 is an example of, and is generically referred to by, the storage device 125 (FIG. 1). The temporary buffer 164-3 is an example of, and is generically referred to by, the temporary buffer 164 (FIG. 1). The destination buffer 156-3 is an example of, and is generically referred to by, the destination buffer 156 (FIG. 1). FIG. 9 illustrates the processing of the read command 162-3 (FIG. 5) in emulating the skip read command 154 (FIG. 2). The storage device 125-3 comprises logical block addresses 905 and respective data blocks 910 stored at the locations identified by the respective logical block addresses 905. The temporary buffer 164-3 comprises addresses 915 and respective data blocks 920 stored at the locations identified by the respective addressees 915. The destination buffer 156-3 comprises addresses 925 and respective data blocks 930 stored at the locations identified by the respective addresses 925.

In response to receiving the skip read command 154, the controller 160 allocates the temporary buffer 164-3 large enough to hold only one skipped block (or large enough to hold one skipped block, the address of the one skipped block and any other information associated with the one skipped block, but not large enough to also hold any other skipped blocks). In response to receiving the skip read command 154, the controller 160 creates the read command 162-3, which requests transfer of the requested blocks from the storage device 125-3 to the destination buffer 156-3 and requests transfer of the skipped blocks from the storage device 125-3 to the same sole location in the temporary buffer 164-3 and sends the read command 162-3 to the storage device 125-3 via the I/O adapter. The storage device 125-3, via the I/O adapter, transfers the requested blocks to the destination buffer 156-3 and transfers the all of the skipped blocks to the same sole location in the temporary buffer 164-3, by transferring the requested block at the logical block address 905 of "64" in the storage device 125-3 to the address 925 of "100" in the destination buffer 156-3, transferring the skipped block at the logical block address 905 of "65" in the storage device 125-3 to the location identified by the address 915 of "90" in the temporary buffer 164-3, transferring the requested block at the logical block address 905 of "66" in the storage device 125-3 to the address 925 of "101" in the destination buffer 156-3, transferring the skipped block at the logical block address 905 of "67" in the storage device 125-3 to the sole location identified by the address 915 of "90" in the temporary buffer 164-3 (overwriting the previous transferred skipped data block at the location identified by the same address), and transferring the requested block at the logical block address 905 of "68" in the storage device 125-3 to the location identified by the address 925 of "102" in the destination buffer 156-3.

In response to the transfer of the requested blocks to the destination buffer 156-3 and the transfer of the two skipped blocks to the sole location at the same address 915 in the temporary buffer 164-3, the controller 160 discards the skipped blocks or deallocates the temporary buffer 164-3 without transferring the skipped blocks from the temporary buffer 164-3 to the destination buffer 156-3, so that the issuer of the skip read command 154 does not receive or read the skipped blocks.

Figure 10:
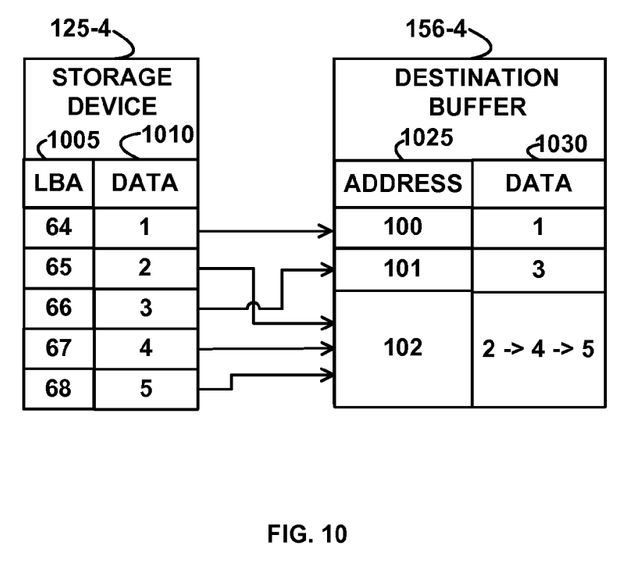
FIG. 10 depicts a block diagram of an example data transfer between a storage device and a destination buffer, according to an embodiment of the invention.

FIG. 10 depicts a block diagram of an example data transfer between a storage device 125-4 and a destination buffer 156-4, according to an embodiment of the invention. The storage device 125-4 is an example of, and is generically referred to by, the storage device 125 (FIG. 1). The destination buffer 156-4 is an example of, and is generically referred to by, the destination buffer 156 (FIG. 1). FIG. 10 illustrates the processing of the read command 162-4 (FIG. 6) in emulating the skip read command 154 (FIG. 2). Referring again to FIG. 10, the storage device 125-4 comprises logical block addresses 1005 and respective data blocks 1010 stored at the locations identified by the respective logical block addresses 1005 in the same row. The destination buffer 156-4 comprises addresses 1025 and respective data blocks 1030 stored at the locations identified by the respective addresses 1025 in the same row.

In response to receiving the skip read command 154, the controller 160 creates the read command 162-4, which requests transfer of the requested blocks from the storage device 125-4 to the locations at the respective addresses "100," "101," and "102" in the destination buffer 156-4 and requests the transfer of the skipped blocks from the storage device 125-4 to the same location in the destination buffer 156-4 that eventually stores the last requested block (the location identified by the address "102") and sends the read command to the storage device 125-4 via the I/O adapter. The storage device 125-4, via the I/O adapter, transfers the requested blocks and the skipped blocks to the destination buffer 156-4 in increasing sequential address order (the requested data block 1010 at the logical block address 1005 of "64," followed by the skipped data block 1010 at the logical block address 1005 of "65," followed by the requested data block 1010 at the logical block address 1005 of "66," followed by the skipped data block 1010 at the logical block address 1005 of "67," followed by the requested data block 1010 at the logical block address 1005 of "68."

Since the storage device 125-4 transfers the skipped blocks (at logical block addresses "65" and "67" to the address 1025 of "102" prior to transferring the last requested data block 1010 from the address 1005 of "68," the data block 1010 from the skipped block at the logical block address 1005 of "67" overwrites the data block 1010 from the skipped block at the logical block address 1005 of "65," and the requested block from the logical block address 1005 of "68" overwrites the skipped block from the logical block address 1005 of "67" in the destination buffer 156-4 at the location identified by the last address 1025 of "102." Thus, the emulation example of FIG. 10 does not need a temporary buffer 164; instead, the controller 160 uses the location identified by the address 1025 that is eventually used by the last requested block (e.g., the address 1025 of "102") to store the skipped blocks. Thus, the issuer of the skip read command 154 does not receive or read the skipped blocks.

Figure 11:
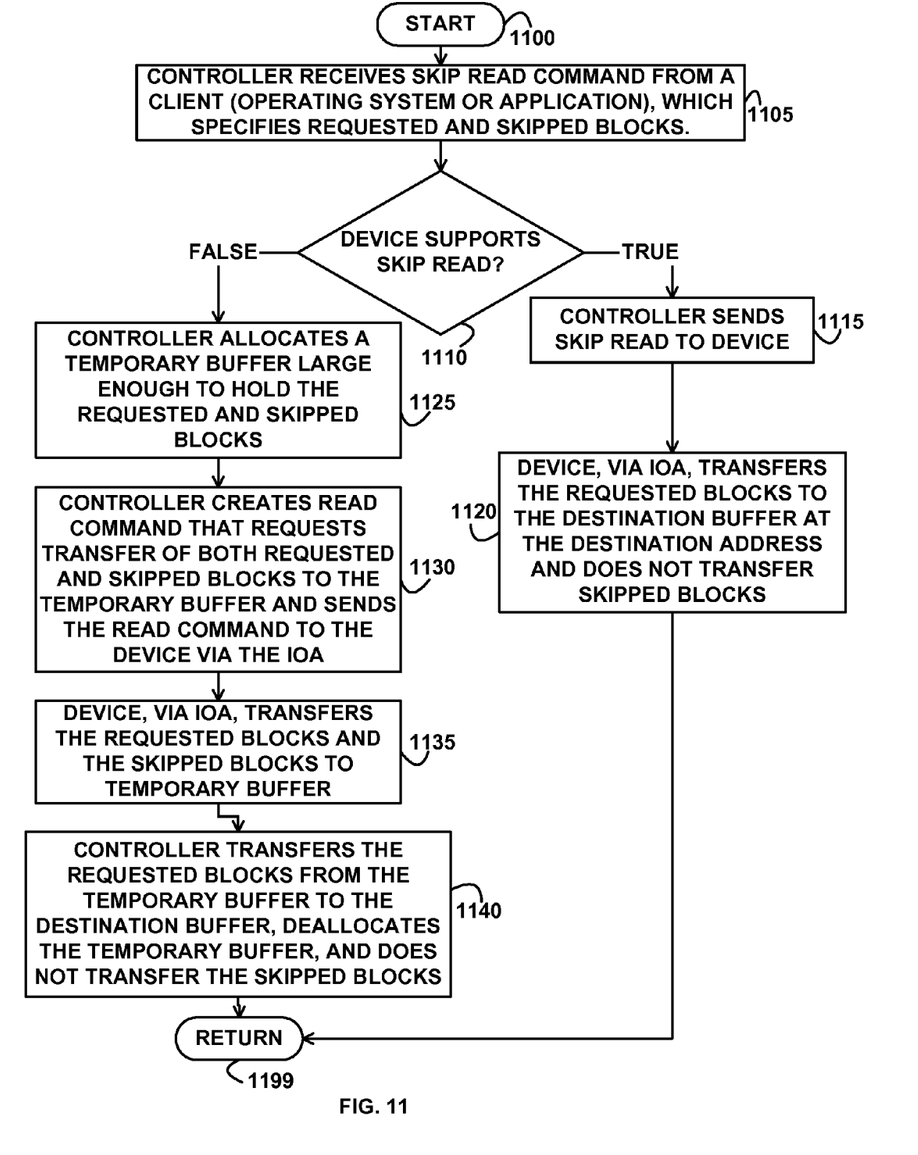
FIG. 11 depicts a flowchart of example processing for emulating a skip read command using a temporary buffer to store requested and skipped blocks, according to an embodiment of the invention.

FIG. 11 depicts a flowchart of example processing for emulating a skip read command using a temporary buffer to store requested and skipped blocks, according to an embodiment of the invention. Control begins at block 1100. Control then continues to block 1105 where the controller 160 receives a skip read command 154 from an issuer or client, such as the operating system 150 or an application 152. The skip read command 154 specifies a destination buffer 156, requested blocks, skipped blocks, and a source storage device 125 and/or an I/O adapter, such as the storage interface 112).

Control then continues to block 1110 where the controller 160 determines whether the source storage device 1125 and/or I/O adapter to which the source storage device 125 is connected supports a skip read operation. If the determination at block 1110 is true, then the source storage device 125 and/or I/O adapter supports a skip read operation, so control continues to block 1115 where the controller 160 sends a skip read command to the storage device 125 or I/O adapter. Control then continues to block 1120 where the source storage device 125, via the I/O adapter, transfers the requested blocks to the destination buffer 156 at the destination address and does not transfer the skipped blocks to the destination buffer 156. Control then continues to block 1199 where the logic of FIG. 11 returns.

If the determination at block 1110 is false, then the source storage device 125 and/or I/O adapter does not support a skip read operation, so control continues to block 1125 where the controller 160 allocates a temporary buffer 164 large enough to hold both the requested blocks and the skipped blocks.

Control then continues to block 1130 where the controller 160 creates a read command 162 that requests transfer of both the requested and the skipped blocks to the temporary buffer 164 and sends the read command to the storage device 125 via the I/O adapter.

Control then continues to block 1135 where the storage device, via the I/O adapter transfers the requested blocks and the skipped blocks to the temporary buffer 164. Control then continues to block 1140 where, in response to the transfer of the requested and skipped blocks to the temporary buffer 164, the controller 160 transfers the requested blocks from the temporary buffer 164 to the destination buffer 156. The controller 160 does not transfer the skipped blocks from the temporary buffer 164 to the destination buffer 156; instead, the controller 160 discards the skipped blocks or deallocates the temporary buffer 164 without transferring the skipped blocks. Control then continues to block 1199 where the logic of FIG. 11 returns.

Figure 12:
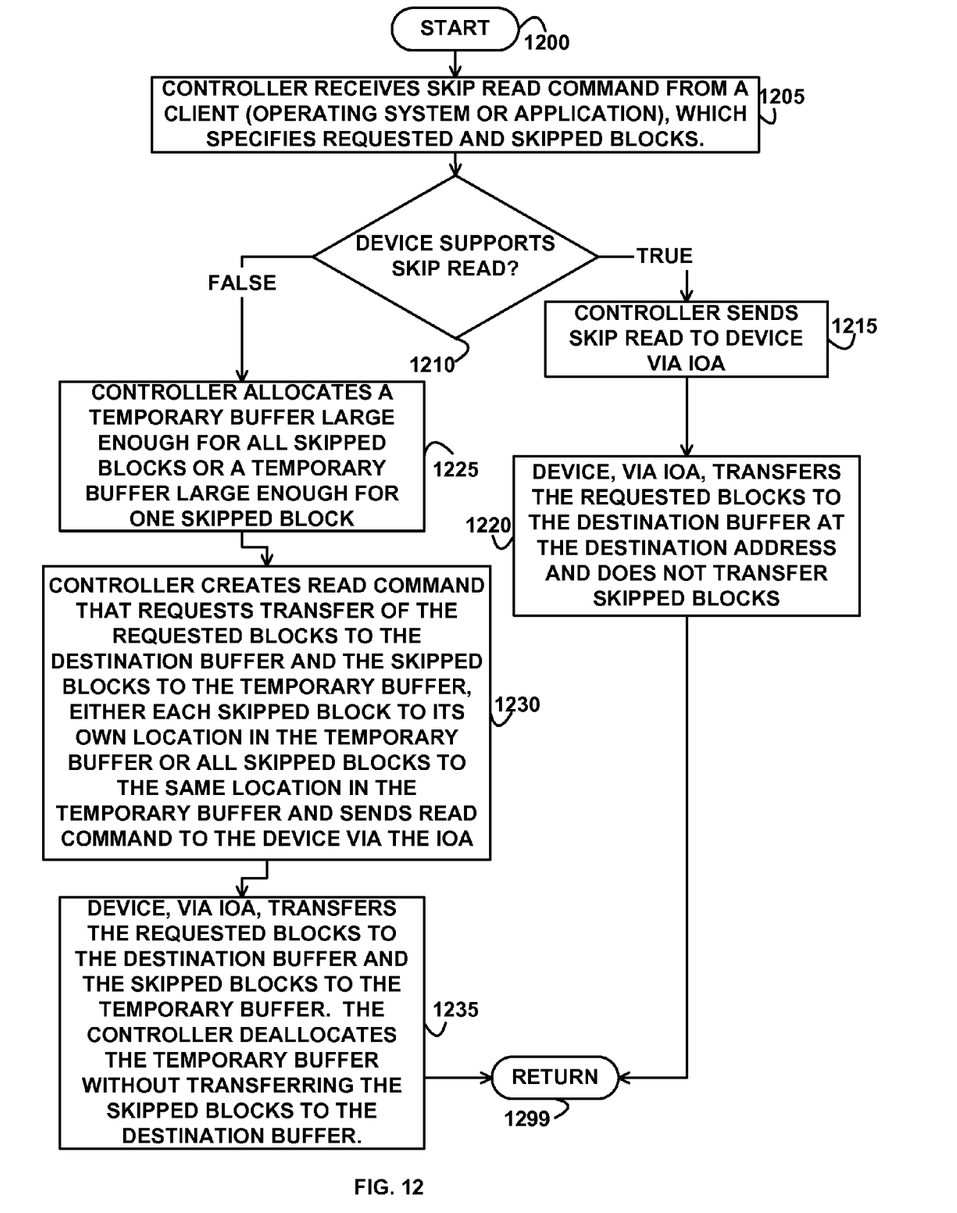
FIG. 12 depicts a flowchart of example processing for emulating a skip read command using a temporary buffer to store skipped blocks, according to an embodiment of the invention.

FIG. 12 depicts a flowchart of example processing for emulating a skip read command using a temporary buffer 164 to store skipped blocks, according to an embodiment of the invention. Control begins at block 1200. Control then continues to block 1205 where the controller 160 receives a skip read command 154 from a client, such as the operating system 150 or an application 152. The skip read command 154 specifies a destination buffer 156, requested blocks, skipped blocks, and a source storage device 125 and/or I/O adapter.

Control then continues to block 1210 where the controller 160 determines whether the source storage device 125 and/or I/O adapter to which the source storage device 125 is connected supports a skip read operation. If the determination at block 1210 is true, then the source storage device 125 and/or I/O Adapter supports a skip read operation, so control continues to block 1215 where the controller 160 sends a skip read command to the storage device 125 or I/O adapter. Control then continues to block 1220 where the source storage device 125, via the I/O adapter, transfers the requested blocks to the destination buffer 156 at the destination address and does not transfer the skipped blocks to the destination buffer 156. Control then continues to block 1299 where the logic of FIG. 12 returns.

If the determination at block 1210 is false, then the source storage device 125 and/or I/O adapter does not support a skip read operation, so control continues to block 1225 where the controller 160 allocates a temporary buffer 164 large enough to store all of the skipped blocks or a temporary buffer 164 large enough to store one skipped block. Control then continues to block 1230 where the controller 160 creates a read command that requests transfer of the requested blocks to the destination buffer 156 and requests transfer of the skipped blocks to the temporary buffer 164 (either each skipped block to its own location in the temporary buffer 164 or all skipped blocks to the same location in the temporary buffer 164) and sends the read command to the source storage device 125 via the I/O adapter.

Control then continues to block 1235 where the source storage device 125, via the I/O adapter, transfers the requested blocks to the destination buffer 156 and transfers the skipped blocks to the temporary buffer 164. The controller 160 deallocates the temporary buffer 164 without transferring the skipped blocks to the destination buffer 156. Control then continues to block 1299 where the logic of FIG. 12 returns.

Figure 13:
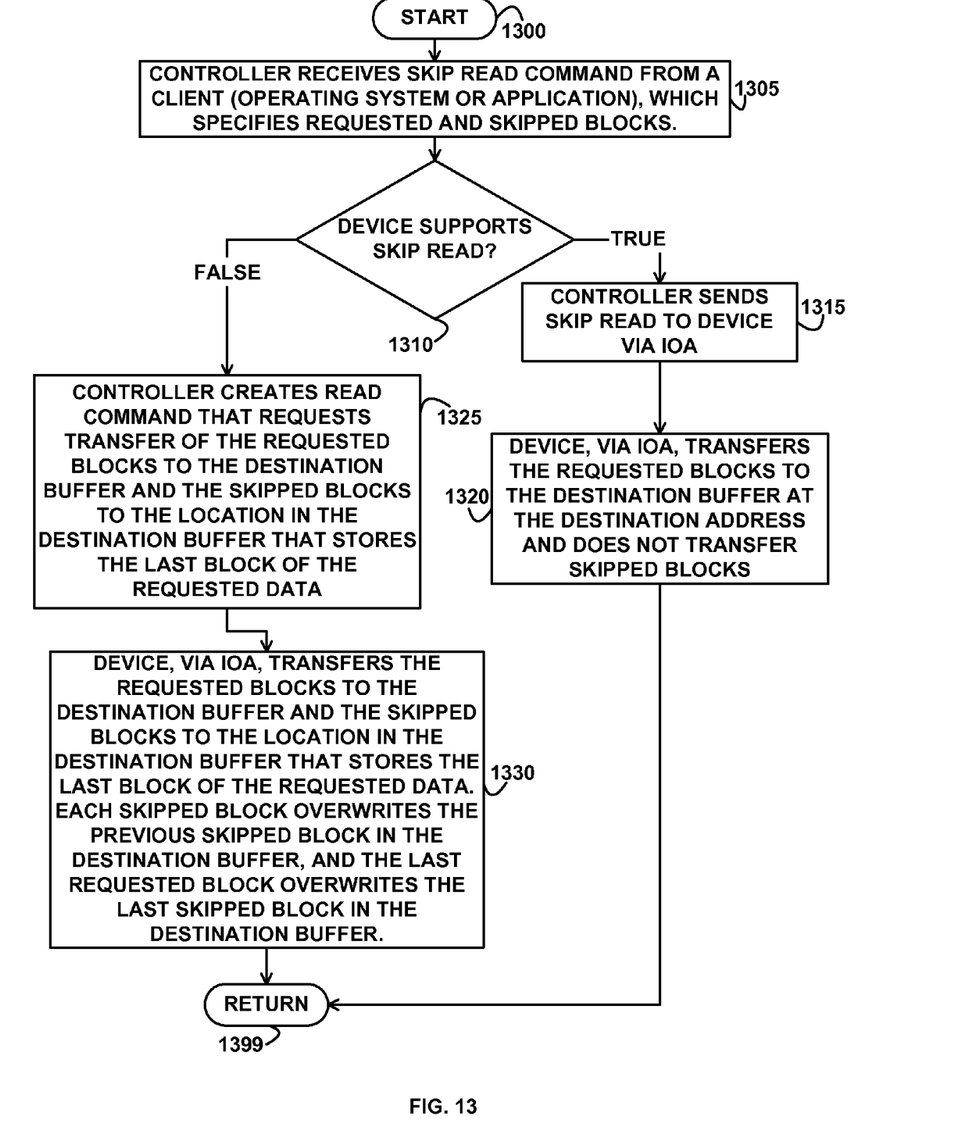
FIG. 13 depicts a flowchart of example processing for emulating a skip read command by overwriting skipped blocks in a destination buffer with a requested block, according to an embodiment of the invention.

FIG. 13 depicts a flowchart of example processing for emulating a skip read command by overwriting skipped blocks in a destination buffer with a requested block, without using a temporary buffer, according to an embodiment of the invention. Control begins at block 1300. Control then continues to block 1305 where the controller 160 receives a skip read command 154 from a client, such as the operating system 150 or an application 152. The skip read command 154 specifies a destination buffer 156, requested blocks, skipped blocks, and a source storage device 125 and/or I/O adapter.

Control then continues to block 1310 where the controller 160 determines whether the source storage device 125 and/or I/O adapter to which the source storage device 125 is connected supports a skip read operation. If the determination at block 1310 is true, then the source storage device 125 and/or I/O adapter supports a skip read operation, so control continues to block 1315 where the controller 160 sends a skip read command to the storage device 125 or I/O adapter. Control then continues to block 1320 where the source storage device 125, via the I/O adapter, transfers the requested blocks to the destination buffer 156 at the destination address and does not transfer the skipped blocks to the destination buffer 156. Control then continues to block 1399 where the logic of FIG. 13 returns.

If the determination at block 1310 is false, then the source storage device 125 and/or I/O adapter does not support a skip read operation, so control continues to block 1325 where the controller 160 creates a read command 162 that requests transfer of the requested blocks to the destination buffer 156 and requests transfer of the skipped blocks to a location in the destination buffer 156 that eventually stores the last block of the requested data. In an embodiment, the controller 160 calculates the address of the last block of the requested data in the destination buffer 156 by calculating the sum of the first address in the destination buffer 156 plus the number of requested blocks multiplied by the block length and stores the resultant summed address in the destination addresses 610 for each of the skipped blocks.

Control then continues to block 1330 where the source storage device 125, via the I/O adapter, transfers the requested blocks to the destination buffer 156 and transfers the skipped blocks to the location in the destination buffer 156 that eventually stores the last requested block. The transfer of each skipped block overwrites the previous skipped block in the destination buffer 156, and the last requested block overwrites the last skipped block in the destination buffer 156. Control then continues to block 1399 where the logic of FIG. 13 returns.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention.

In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention. Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:

receiving a skip read command from a client that requests transfer of at least one requested block within a range of consecutive logical blocks from a storage device to the client and that requests non-transfer of at least one skipped block within said range of consecutive logical blocks from the storage device, said skip read command including skip data specifying, with respect to each logical block within said range of logical blocks, whether the respective logical block is a requested block or a skipped block;

determining whether the storage device supports a skip read operation;

responsive to determining that the storage device supports the skip read operation, sending the skip read command to the storage device, and responsive thereto, receiving the at least one requested block from the storage device into a destination buffer;

responsive to determining that the storage device does not support the skip read operation, (a) creating a read command to the storage device, the read command requesting transfer of all blocks within said range of consecutive logical blocks from the storage device, (b) sending the read command to the storage device, (c) in response to sending the read command, receiving the at least one requested block and the at least one skipped block from the storage device, and (d) in response to receiving the at least one requested block and the at least one skipped block from the storage device, writing only the at least one requested block without the at least one skipped block to said destination buffer; and providing the contents of said destination buffer to the client.

2. The method of claim 1, wherein the skip read command specifies a skip mask comprising an identification of a location of the requested block relative to a location of the skipped block at the storage device.

3. The method of claim 1, wherein the receiving the at least one requested block and the at least one skipped block from the storage device, and in response to receiving the at least one requested block and the at least one skipped block from the storage device, writing only the at least one requested block without the at least one skipped block to said destination buffer, further comprises:

receiving the at least one requested block and the at least one skipped block from the storage device to into a temporary buffer;

transferring the at least one requested block from the temporary buffer to said destination buffer; and refraining from transferring the at least one skipped block from the temporary buffer to the destination buffer.

4. The method of claim 1, wherein the receiving the at least one requested block and the at least one skipped block from the storage device, and in response to receiving the at least one requested block and the at least one skipped block from the storage device, writing only the at least one requested block without the at least one skipped block to said destination buffer, further comprises:

transferring the at least one requested block to a destination buffer;

transferring the at least one skipped block to a temporary buffer; and refraining from transferring the at least one skipped block from the temporary buffer to the destination buffer.

5. The method of claim 4, wherein the transferring the at least one skipped block to the temporary buffer further comprises:

allocating the temporary buffer at a size only large enough to hold a first skipped block; and overwriting a previous skipped block in the temporary buffer with the first skipped block, wherein the skip read command requests non-transfer of the previous skipped block.

6. The method of claim 1, wherein the receiving the at least one requested block and the at least one skipped block from the storage device, and in response to receiving the at least one requested block and the at least one skipped block from the storage device, writing only the at least one requested block without the at least one skipped block to said destination buffer, further comprises:

receiving the at least one requested block and receiving the at least one skipped block from the storage device into said destination buffer, wherein the receiving the at least one requested block overwrites the at least one skipped block with the at least one requested block in the destination buffer.

7. The method of claim 6, wherein the receiving the at least one skipped block further comprises:

receiving the at least one skipped block to a location in the destination buffer that stores a last block of data requested by the skip read command.

8. A non-transitory computer-readable storage medium encoded with instructions, wherein the instructions when executed comprise:

receiving a skip read command from a client that requests transfer of at least one requested block within a range of consecutive logical blocks from a storage device to the client and that requests non-transfer of at least one skipped block within said range of consecutive logical blocks from the storage device, wherein the skip read command specifies a skip mask specifying, with respect to each logical block within said range of logical blocks, whether the respective logical block is a requested block or a skipped block;

determining whether the storage device supports a skip read operation;

responsive to determining that the storage device supports the skip read operation, sending the skip read command to the storage device, and responsive thereto, receiving the at least one requested block from the storage device into a destination buffer;

responsive to determining that the storage device does not support the skip read operation, (a) creating a read command to the storage device, the read command requesting transfer of all blocks within said range of consecutive logical blocks from the storage device, (b) sending the read command to the storage device, (c) in response to sending the read command, receiving the at least one requested block and the at least one skipped block from the storage device, and (d) in response to receiving the at least one requested block and the at least one skipped block from the storage device, writing only the at least one requested block without the at least one skipped block to said destination buffer; and providing the contents of said destination buffer to the client.

9. The computer-readable storage medium of claim 8, wherein the receiving the at least one requested block and the at least one skipped block from the storage device, and in response to receiving the at least one requested block and the at least one skipped block from the storage device, writing only the at least one requested block without the at least one skipped block to said destination buffer, further comprises:

receiving the at least one requested block and the at least one skipped block from the storage device to into a temporary buffer;

transferring the at least one requested block from the temporary buffer to said destination buffer; and refraining from transferring the at least one skipped block from the temporary buffer to the destination buffer.

10. The computer-readable storage medium of claim 8, wherein the receiving the at least one requested block and the at least one skipped block from the storage device, and in response to receiving the at least one requested block and the at least one skipped block from the storage device, writing only the at least one requested block without the at least one skipped block to said destination buffer, further comprises:

transferring the at least one requested block to a destination buffer;

transferring the at least one skipped block to a temporary buffer; and refraining from transferring the at least one skipped block from the temporary buffer to the destination buffer.

11. The computer-readable storage medium of claim 10, wherein the transferring the at least one skipped block to the temporary buffer further comprises:

allocating the temporary buffer at a size only large enough to hold a first skipped block; and overwriting a previous skipped block in the temporary buffer with the first skipped block, wherein the skip read command requests non-transfer of the previous skipped block.

12. The computer-readable storage medium of claim 8, wherein the receiving the at least one requested block and the at least one skipped block from the storage device, and in response to receiving the at least one requested block and the at least one skipped block from the storage device, writing only the at least one requested block without the at least one skipped block to said destination buffer, further comprises:
receiving the at least one requested block and receiving the at least one skipped block from the storage device into said destination buffer, wherein the receiving the at least one requested block overwrites the at least one skipped block with the at least one requested block in the destination buffer.

13. The computer-readable storage medium of claim 12, wherein the receiving the at least one skipped block further comprises:
receiving the at least one skipped block to a location in the destination buffer that stores a last block of data requested by the skip read command.

14. A computer comprising:
a processor; and
memory communicatively coupled to the processor, wherein the memory is encoded with instructions, wherein the instructions when executed on the processor comprise:
receiving a skip read command from a client that requests transfer of at least one requested block within a range of consecutive logical blocks from a storage device to the client and that requests non-transfer of at least one skipped block within said range of consecutive logical blocks from the storage device, wherein the skip read command specifies a skip mask specifying, with respect to each logical block within said range of logical blocks, whether the respective logical block is a requested block or a skipped block;
determining whether the storage device supports a skip read operation;
responsive to determining that the storage device supports the skip read operation, sending the skip read command to the storage device, and responsive thereto, receiving the at least one requested block from the storage device into a destination buffer;
responsive to determining that the storage device does not support the skip read operation, (a) creating a read command to the storage device, the read command requesting transfer of all blocks within said range of consecutive logical blocks from the storage device, (b) sending the read command to the storage device, (c) in response to sending the read command, receiving the at least one requested block and the at least one skipped block from the storage device, and (d) in response to receiving the at least one requested block and the at least one skipped block from the storage device, writing only the at least one requested block without the at least one skipped block to said destination buffer; and
providing the contents of said destination buffer to the client.

15. The computer of claim 14, wherein the receiving the at least one requested block and the at least one skipped block from the storage device, and in response to receiving the at least one requested block and the at least one skipped block from the storage device, writing only the at least one requested block without the at least one skipped block to said destination buffer, further comprises:
receiving the at least one requested block and the at least one skipped block from the storage device into a temporary buffer;
transferring the at least one requested block from the temporary buffer to said destination buffer; and
refraining from transferring the at least one skipped block from the temporary buffer to the destination buffer.

16. The computer of claim 14, wherein the receiving the at least one requested block and the at least one skipped block from the storage device, and in response to receiving the at least one requested block and the at least one skipped block from the storage device, writing only the at least one requested block without the at least one skipped block to said destination buffer, further comprises:
transferring the at least one requested block to a destination buffer;
transferring the at least one skipped block to a temporary buffer; and
refraining from transferring the at least one skipped block from the temporary buffer to the destination buffer.

17. The computer of claim 16, wherein the transferring the at least one skipped block to the temporary buffer further comprises:
allocating the temporary buffer at a size only large enough to hold a first skipped block; and
overwriting a previous skipped block in the temporary buffer with the first skipped block, wherein the skip read command requests non-transfer of the previous skipped block.

18. The computer of claim 14, wherein the receiving the at least one requested block and the at least one skipped block from the storage device, and in response to receiving the at least one requested block and the at least one skipped block from the storage device, writing only the at least one requested block without the at least one skipped block to said destination buffer, further comprises:
receiving the at least one requested block and receiving the at least one skipped block from the storage device into said destination buffer, wherein the receiving the at least one requested block overwrites the at least one skipped block with the at least one requested block in the destination buffer, wherein the receiving the at least one skipped block further comprises receiving the at least one skipped block to a location in the destination buffer that stores a last block of data requested by the skip read command.

* * * * *